US008959607B2

(12) United States Patent
Yadav et al.

(10) Patent No.: US 8,959,607 B2
(45) Date of Patent: Feb. 17, 2015

(54) GROUP KEY MANAGEMENT AND AUTHENTICATION SCHEMES FOR MESH NETWORKS

(75) Inventors: Navindra Yadav, Cupertino, CA (US); Atul Mahamuni, Fremont, CA (US); Jonathan Hui, Foster City, CA (US); Wei Hong, Berkeley, CA (US); Alec Woo, Union City, CA (US)

(73) Assignee: Cisco Technology, Inc., San Jose, CA (US)

( * ) Notice: Subject to any disclaimer, the term of this patent is extended or adjusted under 35 U.S.C. 154(b) by 621 days.

(21) Appl. No.: 13/196,960

(22) Filed: Aug. 3, 2011

(65) Prior Publication Data

US 2013/0036305 A1    Feb. 7, 2013

(51) Int. Cl.
| | |
|---|---|
| *H04L 9/32* | (2006.01) |
| *H04L 9/08* | (2006.01) |
| *H04L 29/06* | (2006.01) |
| *H04W 12/04* | (2009.01) |
| *H04W 12/06* | (2009.01) |
| *H04W 84/18* | (2009.01) |

(52) U.S. Cl.
CPC ............ *H04L 9/0827* (2013.01); *H04L 9/0833* (2013.01); *H04L 9/088* (2013.01); *H04L 9/0891* (2013.01); *H04L 9/321* (2013.01); *H04L 9/3273* (2013.01); *H04L 63/065* (2013.01); *H04W 12/04* (2013.01); *H04W 12/06* (2013.01); *H04W 84/18* (2013.01); *H04L 2463/061* (2013.01)
USPC .............................................. 726/7; 713/168

(58) Field of Classification Search
USPC ............................................................ 726/7
See application file for complete search history.

(56) References Cited

U.S. PATENT DOCUMENTS

| | | | | |
|---|---|---|---|---|
| 7,392,037 | B2 * | 6/2008 | Qi et al. ........................ | 455/410 |
| 7,461,253 | B2 * | 12/2008 | Braskich et al. .............. | 713/169 |
| 2007/0171859 | A1 | 7/2007 | Brahmbhatt et al. | |
| 2009/0052674 | A1 * | 2/2009 | Nishida et al. ................ | 380/278 |
| 2009/0054036 | A1 * | 2/2009 | Chen et al. .................... | 455/411 |

OTHER PUBLICATIONS

Ch. Park, J. Hur, Ch. Kim, Y. Shin, and H. Yoon, "Preauthentication for Fast handoff in Wireless mesh networks with mobile APs," WISA'06, Information security applications, 2007. p. 349-363.*

* cited by examiner

*Primary Examiner* — Matthew Henning
(74) *Attorney, Agent, or Firm* — Edell, Shapiro & Finnan, LLC (57) ABSTRACT

According to one embodiment, techniques are provided to enable secure communication among devices in a mesh network using a group temporal key. An authenticator device associated with a mesh network stores a pairwise master key for each of a plurality of devices in a mesh network upon authentication of the respective devices. Using the pairwise master key, the authenticator device initiates a handshake procedure with a particular device in the mesh network to mutually derive a pairwise temporal key from the pairwise master key. The authenticator device encrypts and signs a group temporal key using the pairwise temporal key for the particular device and sends the group temporal key encrypted and signed with the pairwise temporal key to the particular device.

25 Claims, 10 Drawing Sheets

GROUP KEY MANAGEMENT AND AUTHENTICATION SCHEMES FOR MESH NETWORKS

TECHNICAL FIELD

The present disclosure relates to management of keys and authentication of devices in mesh networks.

BACKGROUND

Mesh networks built on top of wired or wireless media operate as shared media networks. Shared media networks have advantages in terms of ease of deployment, etc., but they are also more susceptible to so-called "man-in-the-middle" attacks because the media is shared. Moreover, conventional pairwise key cryptographic communication techniques are not practical and scalable in a mesh network that may include as many as thousands of devices.

DESCRIPTION OF EXAMPLE EMBODIMENTS

Overview

According to one embodiment, techniques are provided to enable secure communication among devices in a mesh network using a group temporal key. An authenticator device associated with a mesh network stores a pairwise master key for each of a plurality of devices in a mesh network upon authentication of the respective devices. Using the pairwise master key, the authenticator device initiates a handshake procedure with a particular device in the mesh network to mutually derive a pairwise temporal key from the pairwise master key. The authenticator device encrypts and signs a group temporal key using the pairwise temporal key for the particular device and sends the group temporal key encrypted and signed with the pairwise temporal key to the particular device.

According to another embodiment, techniques are provided for a multi-level authentication scheme for devices in a mesh network. Upon boot up of a mesh device, the mesh device determines whether there is at least one valid group temporal key for the mesh network stored in the device. The mesh device initiates a first authentication procedure using the valid group temporal key if one is stored in the device. If there is no valid group temporal key or authentication fails using the first authentication procedure, the device determines whether there is at least one valid pairwise temporal key for the mesh network stored in the device. If at least one valid pairwise temporal key is stored in the device, the device initiates a second authentication procedure using the valid pairwise temporal key.

Example Embodiments

Techniques are described herein for a "group key" used for securing traffic among authenticated devices in a mesh network, and for facilitating authentication of a mesh device upon reboot. Some of the techniques described herein refer to IEEE 802.1X, which is an IEEE standard for port-based network access control. The IEEE 802.1X standard is part of the IEEE 802.1 group of networking protocols. It provides an authentication mechanism to devices seeking to attach to a local area network (LAN) or wireless LAN (WLAN). IEEE 802.1X defines the encapsulation of the Extensible Authentication Protocol (EAP) over IEEE 802 which is known as "EAP over LAN" or EAPOL. However, the references to IEEE 802.1X herein are only an example and the techniques described herein are not limited to IEEE 802.1X.

The 802.1X negotiation involves the Supplicant and Authenticator exchanging a significant number of messages. The authentication negotiation and temporal key negotiation handshakes require at least 18 messages assuming small X.509 certificates. For an Advanced Meter Infrastructure (AMI) deployment where 5000 or more devices communicate through a single Field Area Router on a several hundred kbps radio link, the communication overhead is non-trivial. When multiple devices are requesting network access, care needs to be taken to avoid saturating the link. Furthermore, an Authenticator needs to take into account the dynamic link characteristics and lossy nature of LLNs to efficiently and effectively negotiate network access.

Figure 1:
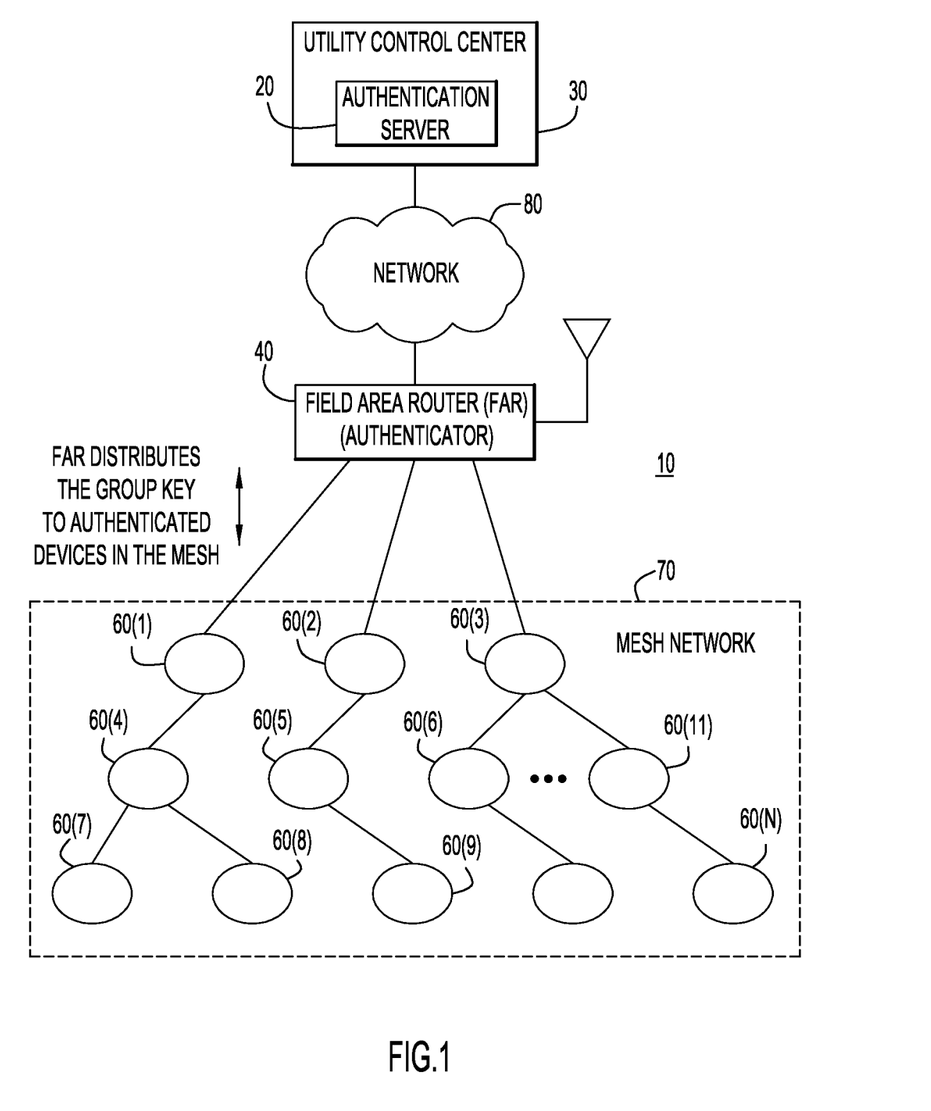
FIG. 1 is a block diagram showing an example of a mesh network deployment in which a group key is used to facilitate protected communication among authenticated devices in the mesh network.

Referring to FIG. 1, a block diagram is described that shows an example of a LLN 10 in which the techniques described herein may be used. There is an authentication server 20 that may be resident in a utility control center 30. The LLN 10 comprises a Field Area Router (FAR) 40 and a plurality of devices 60(1)-60(N). The devices 60(1)-60(N) are part of a "mesh" of devices and referred to herein as "mesh devices." The mesh network is shown at reference numeral 70. The devices 60(1)-60(N) in the mesh network 70 may communicate with each other and the FAR 40 according to the IEEE 802.15.4 communication standard. The FAR 40 communicates with the authentication server 20 by way of the network 80.

The FAR 40 provides wide area network (WAN) connectivity for the devices 60(1)-60(N) in the LLN 10 and hosts the authentication functions. In so doing, the FAR 40 communicates with the authentication server 20 to verify the identity of a device seeking authentication. The FAR 40 also serves as an enforcement point and drops all link frames that are not protected using the keying material, unless such link frames are part of the network access control negotiation from a joining device. There may be multiple FARs in a given LLN and for simplicity a single FAR 40 is shown, but it is to be understood that this is by way of example only.

Examples of uses for the following techniques are utility (e.g., power) distribution system deployments, such as AMI utility networks. In a utility data network deployment, the devices 60(1)-60(N) are meter devices, switches, relays and other power distribution or telemetry devices that are remotely controlled by a suitable management server (not shown in FIG. 1). Before these devices can actively participate in these power distribution and telemetry functions, they need to be authenticated. Authentication involves an exchange of messages between the wireless device to be authenticated and the FAR 40. The FAR 40 serves as an Authenticator.

Authenticated Devices are devices that have already been authenticated and gained network access from a FAR by obtaining link-layer keying material. Authenticated Devices also serve as enforcement points and drop all link frames that are not protected using the link-layer keying material, unless such link frames are part of the network access control negotiation from a Joining Device. The FAR 40 may also be considered an Authenticated Device.

Joining Devices are devices that are seeking/requesting network access from an Authenticator. Such devices may communicate directly with the FAR 40 or through an Authenticated Device. The Authenticated Device serves as a proxy for IEEE 802.1X negotiations. Depending on the location of the device, it may be one hop, two hops, three hops, etc., from the FAR 40. For example, in FIG. 1, devices 60(1), 60(2) and 60(3) are all one hop from the FAR 40, devices 60(4), 60(5), 60(6) and 60(11) are all two hops from the FAR 40, and devices 60(7), 60(8), 60(9) and 60(10) are all three hops from the FAR 40.

While the techniques presented herein are described in connection with a wireless LLN (e.g., a wireless mesh network), this is only an example and not meant to be limiting. LLNs are not necessarily constrained to wireless networks and can also apply to wired environments. For example, Power Line Communication technology is a wired connectivity technology that exhibits many of the same characteristics as wireless mesh networks (relatively high loss rates compared to traditional link technologies used in IP networks, time-varying link qualities and interference, and a communication medium that is not a single broadcast domain, etc.). In general, an LLN refers to any network that communicates over links that exhibit higher loss rates than a typical Ethernet-based network and connectivity is not well-defined by physical connections. Thus, the techniques described herein are applicable to wireless and wired LLN environments.

According to one aspect, techniques are provided to facilitate authenticated communication devices in a mesh network using what is referred to hereinafter as a "group" or "mesh" key. Authenticated devices in the mesh network communicate with each other using the group key. The group key creates a logical separation between authenticated devices (also called "insider" devices) and non-authenticated devices (also called "outsider" devices). Insider devices are those mesh devices which have been successfully authenticated and have been authorized to join the mesh network. The group key greatly reduces the burden on individual mesh devices as compared with pairwise key encryption techniques. The group key concepts are described below in connection with FIGS. 4-6, 7A and 7B.

According to another aspect, techniques are provided for efficient and fast startup of mesh network devices using a multi-level hierarchical authentication scheme. The multi-level hierarchical authentication scheme is described below in connection with FIGS. 8 and 9.

Prior to describing the techniques of FIGS. 2-7B and 8 and 9, example block diagrams of an authenticator device and of a mesh device are described.

Figure 2:
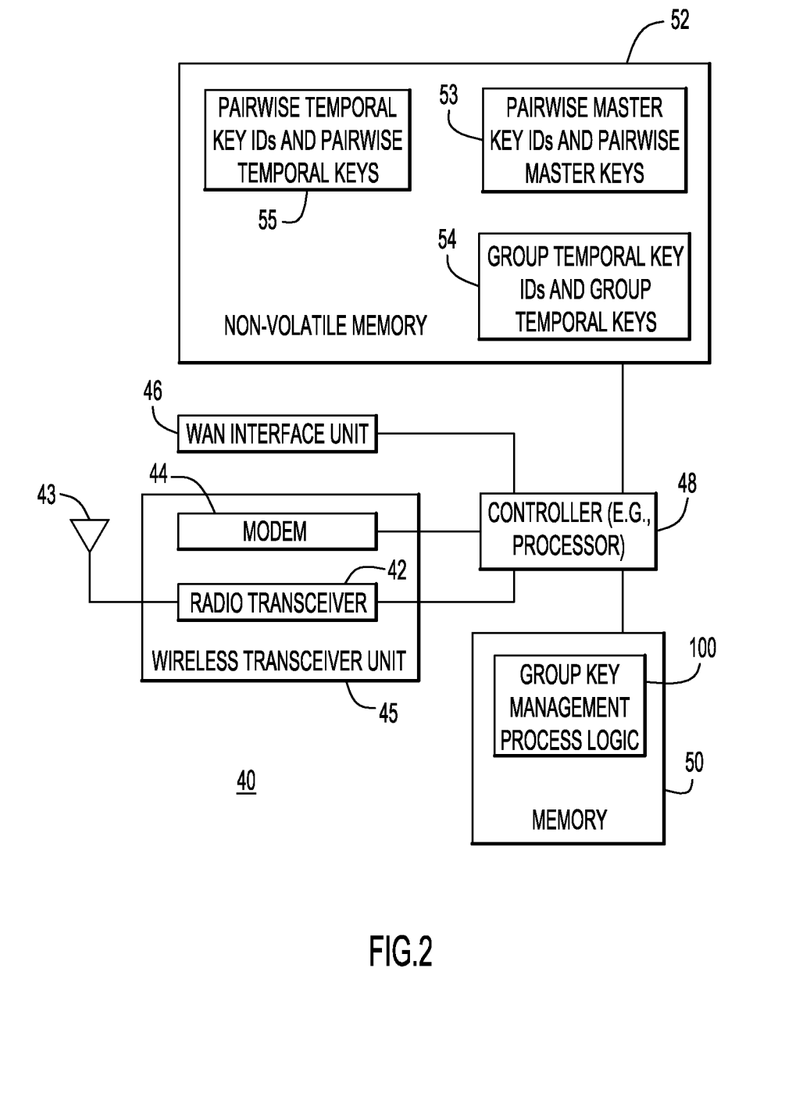
FIG. 2 is a block diagram of an example authenticator device configured to manage and deploy group keys to authenticate devices in the mesh network.

Reference is now made to FIG. 2 for a description of a block diagram of the FAR 40 according to one example. The FAR 40 is a device that is configured to communicate with the mesh network 70 and to communicate over a WAN connection on behalf of the devices in the mesh network 70 for data/control purposes as well as to authenticate the wireless devices in the mesh 70. To this end, the FAR 40 comprises a radio transceiver 42, at least one antenna 43, a modem 44, a WAN interface unit 46, a controller 48 and a memory 50. There is also a non-volatile memory 52 that is used to store encryption key associations, etc., as described hereinafter, though the memory 50 may also store the key associations as well. The non-volatile memory 52 may also store a mapping between identifiers (IDs) (described by one or more bytes) and keys, e.g., data for group temporal key IDs mapped to corresponding group temporal keys shown at 53, data for pairwise master key IDs mapped to corresponding pairwise master keys shown at 54 and data for pairwise temporal key IDs mapped to corresponding pairwise temporal keys. The group temporal keys, pairwise temporal keys and pairwise master keys are described hereinafter. The WAN interface unit 46 may be a wired network interface unit (e.g., an Ethernet card) or a wireless interface unit (e.g., cellular or WiMAX™ interface wireless interface unit). In one example, the radio transceiver 42 and modem 44 comprise one or more integrated circuit chips that are configured to perform wireless communication in accordance with the IEEE 802.15.4 wireless personal area network (WPAN) communication protocol to communicate with the wireless devices in the mesh 70. The radio transceiver 42 and modem 44 may be considered parts of a wireless transceiver unit 45. The WAN interface unit 46 enables WAN communications so that the FAR 40 can communicate with the authentication server 30 as well as other servers reachable over a LAN or WAN. The controller 48 is a data processor, e.g., a microprocessor or microcontroller, that is configured to execute software instructions stored in memory 50. In the case in which the LLN is a wired network, then the wireless transceiver unit 45 is a transceiver unit comprising a transceiver 42 and a modem 44 that are configured for wired communication over a wired (copper or optical) network media.

The memory 50 may comprise read only memory (ROM), random access memory (RAM), magnetic disk storage media devices, optical storage media devices, flash memory devices, electrical, optical, or other physical/tangible memory storage devices. The memory 50 stores computer executable software instructions for group key management process logic 100. The authentication scheduling process logic 100 comprises software instructions that cause the controller 48 to perform group key management and deployment techniques as described herein. Thus, in general, the memory 50 may comprise one or more tangible computer readable storage media (e.g., a memory device) encoded with software comprising computer executable instructions and when the software is executed (by the controller 48) it is operable to perform the operations described herein in connection with process logic 100.

Figure 3:
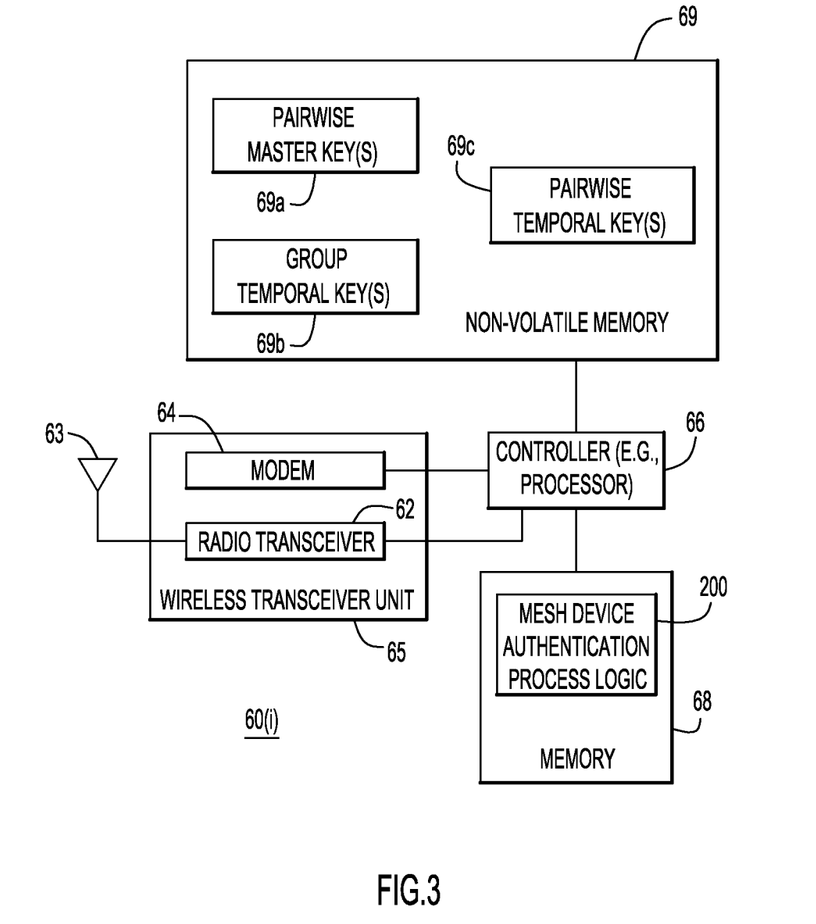
FIG. 3 is a block diagram of an example mesh device configured to perform mesh device authentication operations.

Reference is now made to FIG. 3 for a description of an example of a block diagram of a device, generically referred to at reference numeral 60(i), that is configured to perform group key authentication functions. The device 60(i) comprises a radio transceiver 62, at least one antenna 63, a modem 64, a controller 66 and a memory 67. In one example, the radio transceiver 62 and modem 64 comprise one or more integrated circuit chips that are configured to perform wireless communication in accordance with the IEEE 802.15.4 WPAN communication protocol to communicate with other mesh devices in the mesh network 70 and with the FAR 40. There is also a non-volatile memory 68 that stores data for one or more pairwise master keys 69A, for one or more group temporal keys 69B, and for one or more pairwise temporal keys 69C, as well as IDs for the respective keys. The pairwise master keys, pairwise temporal keys, and group temporal keys are described further hereinafter.

The radio transceiver 62 and modem 64 may be considered parts of a wireless transceiver unit 65. The controller 66 is a data processor, e.g., a microprocessor or microcontroller, that is configured to execute software instructions stored in memory 68. In the case in which the LLN is a wired network, then the wireless transceiver unit 65 is a transceiver unit comprising a transceiver 62 and a modem 64 that are configured for wired communication over a wired (copper or optical) network media.

The memory 67 may comprise ROM, RAM, magnetic disk storage media devices, optical storage media devices, flash memory devices, electrical, optical, or other physical/tangible memory storage devices. The memory 67 stores computer executable software instructions for mesh device authentication process logic 200. The process logic 200 comprises software instructions that cause the controller 66 to mesh device authentication techniques as described herein. Thus, in general, the memory 67 may comprise one or more tangible computer readable storage media (e.g., a memory device) encoded with software comprising computer executable instructions and when the software is executed (by the controller 66) it is operable to perform the operations described herein in connection with process logic 200.

Figure 4:
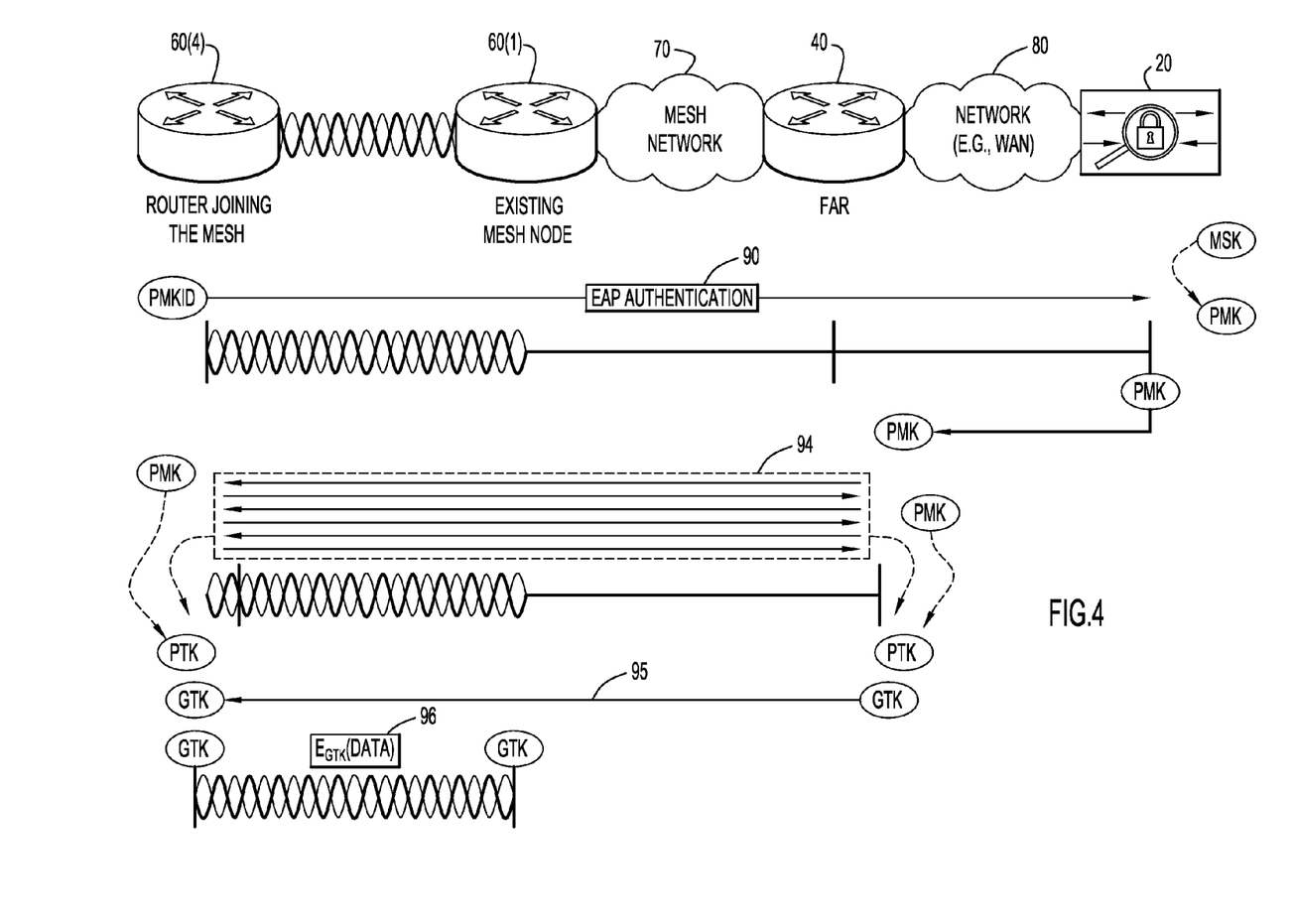
FIG. 4 is a diagram depicting the flow of messages between a mesh device seeking authentication and the authenticator device deploying the group key to the mesh device.

With reference to FIG. 4, the general flow of group key based authentication is now described. In this example, a joining device is device 60(4), and it is one hop from a device already joined to the mesh network, device 60(1). At 90, a mesh device, e.g., mesh device 60(4) authenticates with the authentication server 20 by way of, for example, Extensible Authentication Protocol (EAP) techniques. The authentication server 20 generates a unique Master Session Key (MSK) for each mesh device when it authenticates that mesh device. The MSK is a shared secret key exported by, for example, the particular cryptographic method(s) used with the EAP techniques. The MSK is used derive keying material (i.e., PMK and PTK) which is ultimately used to securely deliver group keying material to the mesh device. Also at 90 the authentication server 20 derives, for a particular mesh device, a Pairwise Master Key (PMK) from the MSK. At 92, the authentication server 20 sends the PMK to the authenticator device, e.g., FAR 40. The FAR receives and stores PMKs (and not MSKs). The FAR 40 stores PMKs received from the authentication server 20 for each of a plurality of devices in a mesh network. At 94, using the PMK, the FAR 40 initiates a handshake to mutually derive a Pairwise Transient or Temporal key (PTK) with the device 60(4). For example, the 4-way handshake of IEEE 802.11i is used to mutually derive the PTK.

The authentication server 20 generates the MSK to be valid for a period of time such that PTKs are derived from the PMK (which was in turn derived from the MSK) only while the MSK is valid. The PMK and PTK are encoded with lifetime information to indicate how long each is valid. A lifetime is a time duration or period for which a key is valid with respect to some initial start time. The concept of a lifetime is also referred to hereinafter in connection with other types of keys. The PTK is encoded with a lifetime that is less than the lifetime of the PMK.

The FAR 40 generates a group temporal key (GTK) using, for example, a random number generator process. The GTK is the aforementioned group key, also referred to herein as the mesh key. The GTK is valid for a certain period of time and is encoded with lifetime information (a timer) to allow a mesh device to evaluate its validity. For example, the lifetime of a GTK is several days, weeks, months, a year, etc., depending on the desired level of security. The FAR 40 may use an encryption key to protect the keying material (PMK, PTK, GTK) when it is stored in its non-volatile memory.

At 95, the FAR 40 uses the PTK to encrypt and sign the GTK and sends the GTK (encrypted and signed with the PTK) to the mesh device 60(4). Because the PTK is known only to the FAR and the particular device, e.g., device 60(4), to which the FAR is sending the GTK, other devices internal or external to the mesh network cannot obtain the GTK if they were to intercept, tap or otherwise obtain messages from that exchange. The FAR communicates the GTK separately to each mesh device seeking to join the mesh network. The PTK is derived from the PMK to limit how often the PMK is used. A particular PTK is unique to a single mesh device and can only be used to communicate one or more GTKs to a particular mesh device. As a result, the PMK (and thus MSK) can have a longer lifetime.

Still referring to FIG. 4, at 96, the mesh device signs and optionally encrypts its traffic communicated in the mesh network using the GTK. As a result, existing devices in the mesh will have the GTK and can distinguish any traffic they receive as authentic traffic based on whether the traffic is signed with the GTK. More than one GTK may be valid at any given time and each mesh device can also verify whether traffic it receives is authentic based on the validity of the GTK used to sign that traffic. A mesh device evaluates received packets in the mesh network to determine whether it is signed with a valid GTK, and discards packets that are not signed using a valid GTK. If a mesh device roams in the mesh network, and thus attaches via a different neighboring mesh device than it was originally attached to, the roamed mesh device still sends traffic signed with the GTK. In so doing, the traffic sent from the roamed device to the new neighboring devices proves that the roamed device has knowledge of the GTK and the traffic to and from the roamed device is admitted.

In one form, every mesh device can send and respond to a group key association validation request. However, only the authenticator device, e.g., the FAR, can respond to a PTK/PMK validation request.

Figure 5:
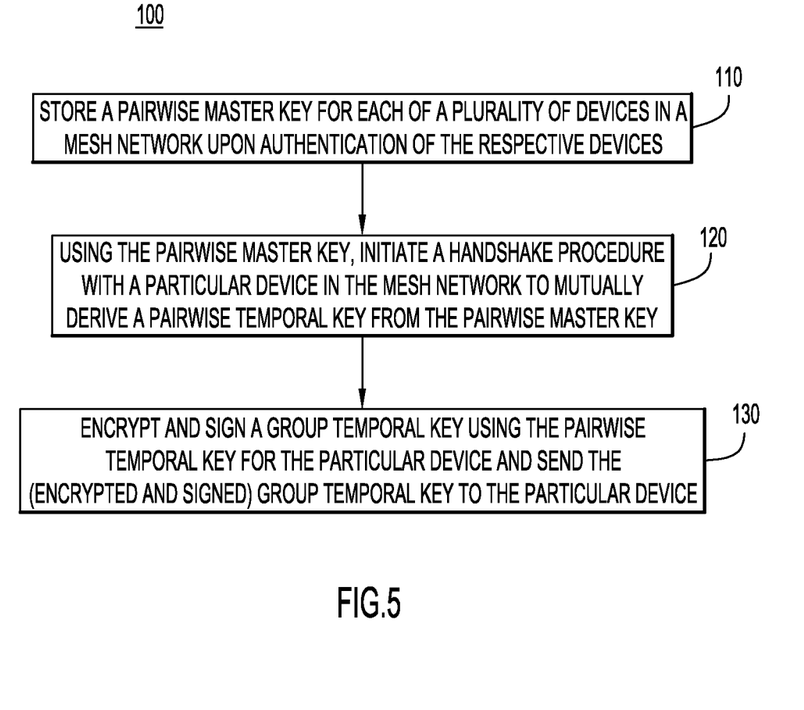
FIG. 5 is a flow chart depicting operations performed by the authenticator device in deploying the group key to a mesh device seeking authentication.

Reference is now made to FIG. 5 for a description of a flow chart depicting operations of the group key management process logic 100 in an authenticator device, e.g., the FAR 40, in connection with the flow depicted in FIG. 4. At 110, the authenticator device stores a unique PMK for each of a plurality of devices in the mesh network upon authentication of the respective devices. Again, the authenticator device obtains the PMK for a particular device from the authenticator server 20. At 120, using the PMK, the authenticator device initiates a handshake procedure with a particular device in the mesh network to mutually derive a PTK from the PMK for that particular device. At 130, the authenticator device encrypts and signs a GTK using the PTK for the particular device and sends the (encrypted and signed) GTK to the particular device.

At any time, a mesh device may validate its immediate neighbors in the mesh network. In one example, a mesh device sends a challenge message to one or more neighboring devices in the mesh network. The challenge message is configured to cause the one or more neighboring devices to generate a response message that is signed with the GTK and to send the response message back to the particular mesh device that sent the challenge message. For example, a neighboring device that receives the challenge message use its media access control (MAC) address and the challenge message, signs it with the GTK and sends a response message to the device that sent the challenge message. The particular mesh device receives the response message, evaluates the signature of the response message to determine whether the signature value, and when it determines that the signature is valid, it generates data that it stores to indicate that the neighboring device that sent the response message is a valid neighboring device and adds that neighboring device (using the MAC address contained in the response message) to its valid neighbor list. A newly joined mesh device may perform this process for each of its neighbors. Moreover, a newly admitted mesh device sends to the authenticator device, e.g., FAR, data describing a list of its neighbor devices. The authenticator device sends to each of the devices in the mesh network a message comprising information indicating which devices are considered valid (e.g., "insider" nodes) in the mesh network based on the mesh devices that it has authenticated and neighbor lists it receives from authenticated mesh devices. The authenticator device may encrypt this message with the GTK and also sign it.

Figure 6:
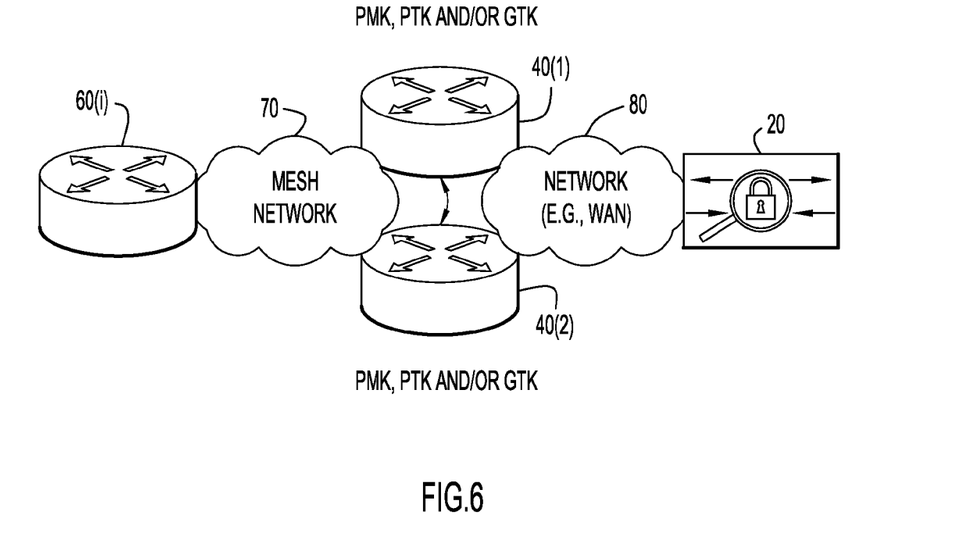
FIG. 6 is a diagram depicting multiple authenticator devices configured to jointly manage and deploy group keys.

Referring to FIG. 6, a diagram is shown in which there are multiple FARs in a network deployment, for example, FAR 40(1) and FAR 40(2). FIG. 6 shows that the PMK, PTK, and/or GTKs may be synchronized between the multiple FARs.

Figure 7A:
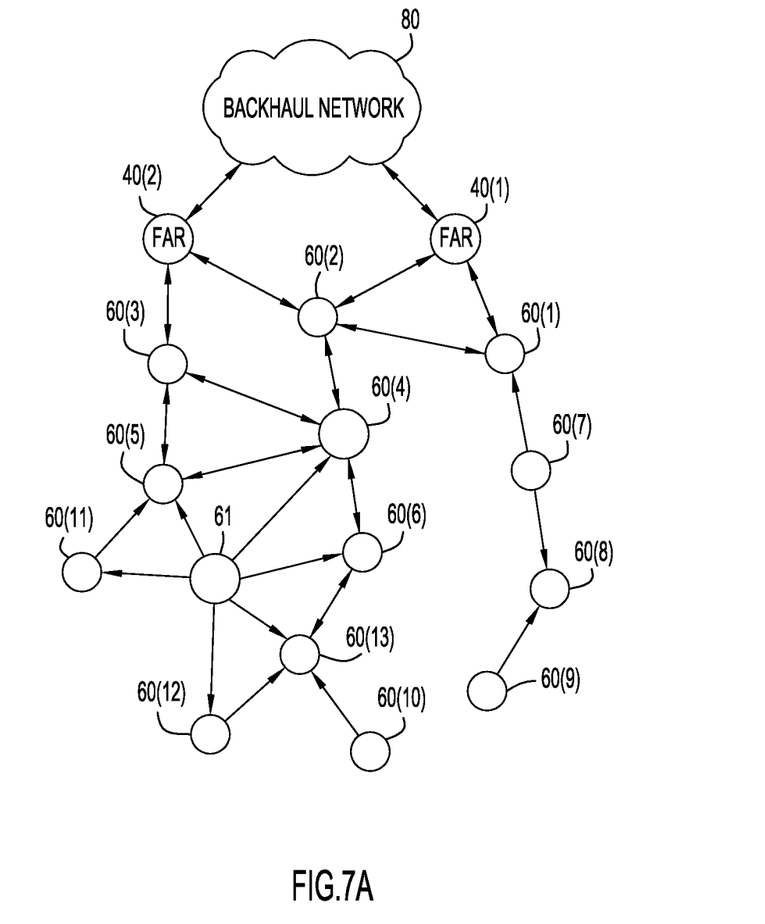
FIG. 7A is an example block diagram of a mesh network in which a malicious node is present.
Figure 7B:
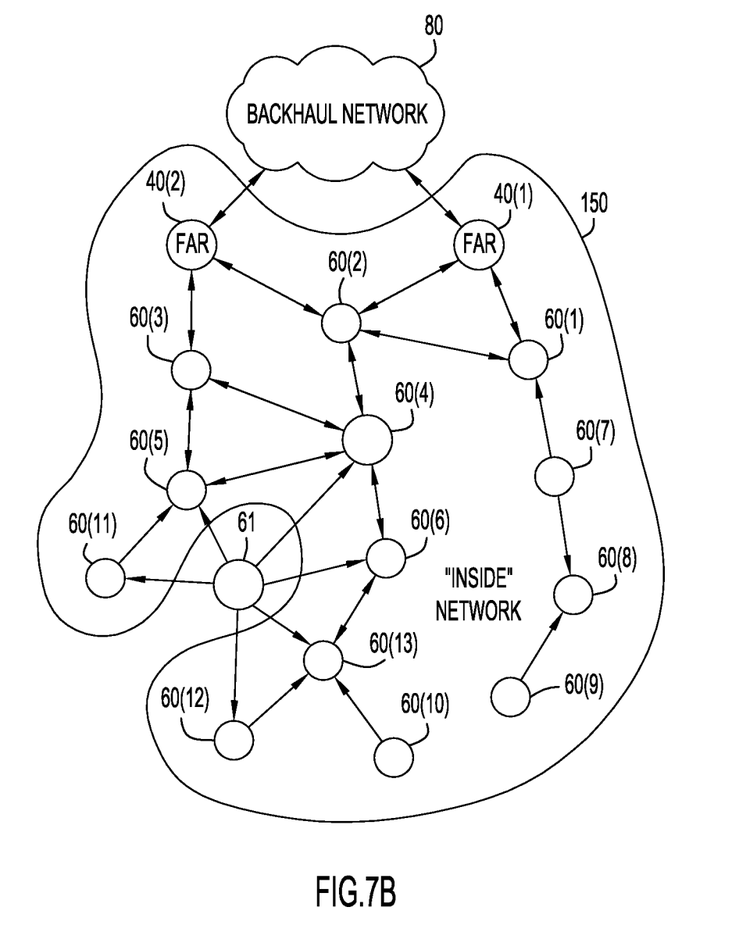
FIG. 7B is an example block diagram of a mesh network similar to FIG. 7B, but in which a group key is deployed, thereby containing the impact of the malicious node.

Turning now to FIGS. 7A and 7B, examples of the benefits of the group key/mesh key are described. As mentioned above, one effect of the group key (mesh key) is that it creates a logical separation of the "insiders" from the "outsiders" both of which can access the media. The insider nodes are the mesh nodes which have been successfully authenticated and have been authorized to join the network. FIG. 7A shows an example of a mesh network that does not employ the group key. In this example, there are two FARs 40(1) and 40(2), and a plurality of mesh devices 60(1)-60(12). A malicious node is shown at 61. This node may send malicious messages and/or attempt to pose as an authenticated node. FIG. 7B shows the same mesh network architecture as shown in FIG. 7A but which uses the group key described above. The "inside" network consisting of mesh devices that have been provided a group key is shown at 150. Since the messages sent by the malicious node 61 are not signed with the group key, the "insider" mesh devices (that have the group key) will receive the messages, determine that the messages are not signed with the group key and discard or drop them. As a result, the messages sent by the malicious node will not get propagated/forwarded throughout the mesh network. Thus, one benefit of the group key is that it will protect the mesh network from a "man-in-the-middle" attack of the type depicted in FIG. 7B. The insider nodes may choose to encrypt (in addition to sign) their messages using the group key. As a result, outsider nodes cannot properly read the contents of messages sent by insider nodes. Thus another benefit of the group key is that messages can be kept confidential from outsider nodes.

Figure 8:
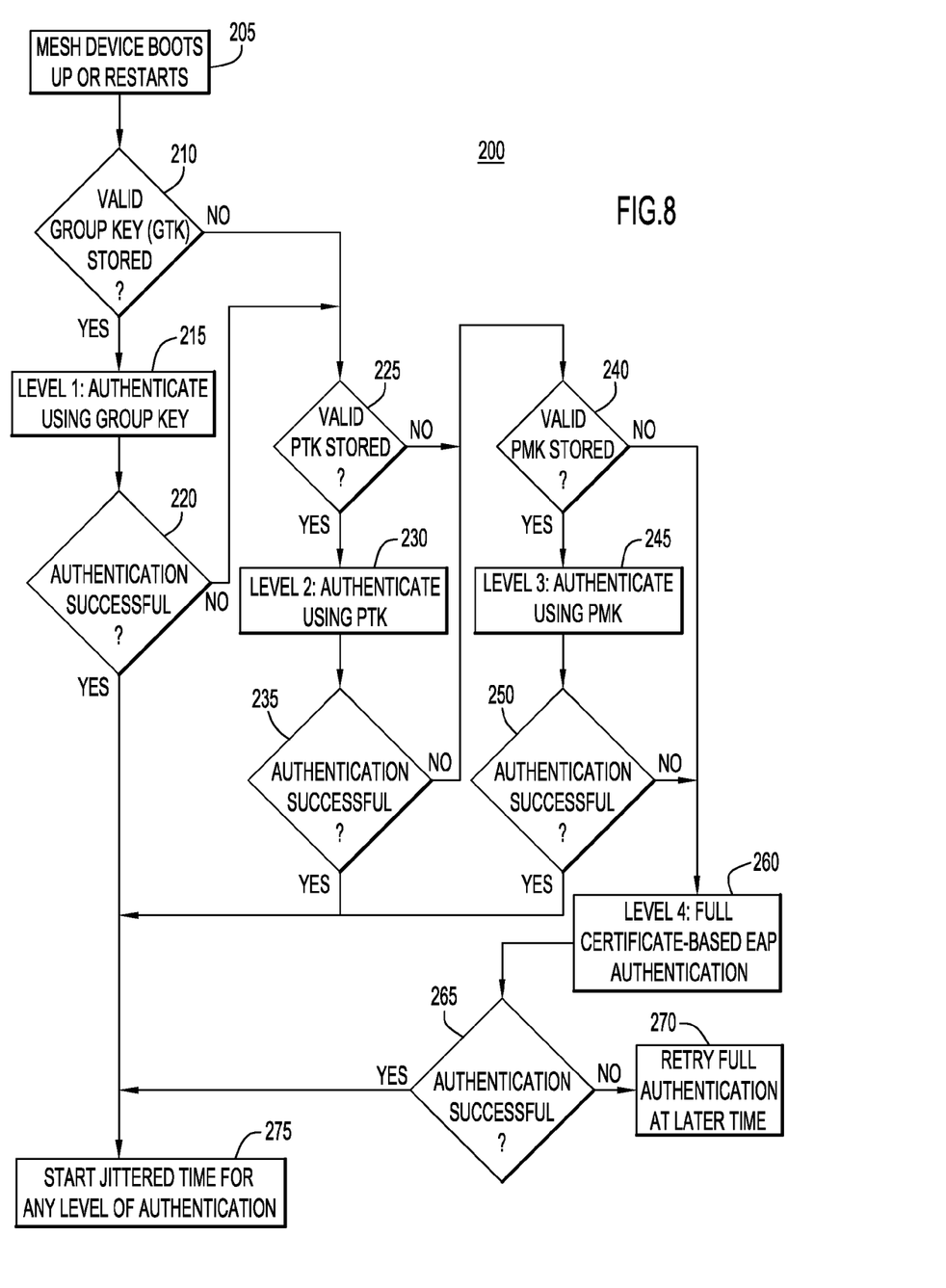
FIG. 8 is a flow chart depicting operations performed by a mesh device in connection with a multi-level hierarchical authentication scheme.

Reference is now made to FIG. 8 for a description of further techniques to facilitate operation of authenticated devices in a mesh network. FIG. 8 depicts the flow of certificate-based IEEE 802.1x/EAP authentication, with PMK/PTK/GTK security association caching for efficiency and fast startup of a device in the mesh network. There are several hierarchical levels of authentication procedures for access control and device admission. The level selected and employed when a mesh device boots up depends on the security setting for the mesh network. The degree of security may be configured by a network management station for the mesh network, such as by a sliding bar from low to high in terms of security level. For example, a higher degree of security would result in short key caching intervals and more control bandwidth being consumed by access control traffic. A lower security setting would use less bandwidth and use much longer timers (perform fewer full authentications, etc). The security settings would not just impact access control but would also impact other features like behavioral security, anomaly detection, etc.

The multi-level hierarchical authentication scheme generally follows the logic where mesh devices, at any given time, can fall into one of three classes for purposes of authentication: 1) Level 1—Authentication based on a valid GTK; 2) Level 2—Authentication based on a valid PTK; 3) Level 3—Authentication based on a valid PMK; and 4) Level-4 Authentication based on EAP exchange with an authentication server (Full Authentication). The pairwise master key effectively acts as a temporary token from the authentication server, allowing a FAR to authenticate devices without involving the authentication server.

At 205, a mesh device boots up, either for the first time, or re-starts due to a power outage, intentional power reset, etc. After boot up, at 210, the mesh device checks its secure memory to see if there is a valid GTK security association stored in its memory, e.g., its non-volatile memory. For a security association of a GTK to be valid, the following conditions have to be met:

1. The current time has to lie within the valid lifetime range of the GTK, in other words, the GTK's lifetime has not expired at the time the mesh device boots up and wants to join the mesh network.

2. The PAN ID associated with the GTK is one the mesh device wants to join.

3. The next sequence number (frame counter) still has room for at least a predetermined number of frames, e.g., 1000 frames.

If more than one GTK association is valid in the mesh device, the GTK association with longest valid lifetime left is selected.

Thus, at 210, the mesh device determines whether the GTK is valid based on a lifetime range for the group key and a frame sequence availability for a predetermined number of frames. When there are multiple valid GTKs, the GTK having the longest remaining (valid) lifetime is selected.

When at 210 it is determined that there is a valid group key stored in the mesh device, then at 215, a first (and fastest) level of authentication is performed (Level 1). This first authentication procedure uses the valid GTK and is, among the plurality of authentication procedures, the most efficient.

There are several ways to implement this first authentication procedure, for example, a centralized approach or a distributed approach. With the centralized approach the authenticator is one of the FARs (PAN coordinator in 802.15.4 terminology) and with the distributed approach the authenticator is a next hop coordinator (one-hop neighbor mesh device) which is already admitted into the PAN. The distributed approach is the more efficient and scalable scheme. The mesh device sends an authentication request message to either a centralized authenticator device or to a one-hop neighbor mesh device that has already been authenticated.

The authentication request frame/message formats may vary. The authentication request message contains information configured to indicate to the authenticator device that authentication is requested using the GTK. In one example, a control field flag is set in the authentication request message to indicate that a GTK is used, and a field is included in the message that is used to identify the GTK itself (e.g., a multiple byte group key ID field). This indicates to the authenticator that the GTK based authentication method is being used and the GTK ID field indicates to the authenticator which group key is used without actually sending the group key, since the authenticator can match the group key used from the GTK ID in the message based on information that it stores for all GTKs in the mesh network (as explained above in connection with FIG. 2).

The first authentication procedure involves an exchange of messages and ultimately the authenticator sends an authentication success response frame or message. The reason for exchanging explicit authentication request and responses is the mesh state may have changed. For example, a new group key may be active at any time, indicated by a group key overlap period. The authentication response message allows the new mesh node to be informed that there is a new group key that is active. Thus, when the mesh device receives a response message comprising information indicating that there is a new group key, the mesh devices sends an explicit request message to the authenticator device requesting the new group key, as the new group key is to be protected with the PTK. For forward secrecy reasons, a node no longer part of the mesh with access to the old group key could get the new group key.

At 220, it is determined whether authentication (with the first level authentication procedure) is successful and also whether the lifetime of the GTK has not expired. If the level 1 authentication procedure using the GTK fails or the GTK lifetime has expired, the mesh device attempts to use the next level of optimized authentication available with to it. This is the Level 2 authentication procedure and is based on a valid PTK. At 225, the mesh device searches its local memory (e.g., non-volatile memory) for any valid PTKs. For a PTK security association to be valid, the following conditions have to be met:

1. The current time has to lie within the valid lifetime range of the PTK.
2. The PAN ID associated with the PTK is one the mesh network wants to join.
3. The next sequence number (frame counter) still has room for at least a predetermined number of frames, e.g., 100 frames.

If there are multiple valid PTK associations, all of them are selected (this is different from the GTK of the Level 1 authentication procedure).

At 230, the mesh device attempts Level 2 authentication using a valid PTK. The mesh device sends an authentication request message to the authenticator indicating the PTKs that are valid on the device. The authenticator then examines the message and the key information stored on the authenticator. If the authenticator has a valid PTK for the device and the device claims to have a valid PTK, the authenticator will attempt to communicate a new GTK using the PTK as described above in connection with FIG. 4. There may be more than one authenticator in the mesh network, e.g., more than one FAR (or the authenticator function can be pushed into the mesh) and the FARs may not have synchronized their PTK key state. Thus, the authenticator may be centralized or distributed.

At 235, it is determined whether authentication (with the second level authentication procedure) is successful and whether the PTK lifetimes of all the PTKs used for authentication have expired. If the level 2 authentication procedure fails or the PTK lifetime has expired, the mesh device attempts to use the next level of optimized authentication available with to it. This is the level 3 authentication procedure. At 240, the mesh device searches its local memory (e.g., non-volatile memory) for all valid PMK security associations. For a PMK security association to be valid, the following conditions have to be met:

1. The current time has to lie within the valid lifetime range of the PMK.
2. The PAN ID associated with the PMK is one the mesh network wants to join.
3. The next sequence number (frame counter) still has room for at least a predetermined number of frames, e.g., 1000 frames.

If there are multiple valid PMK associations, all of them are selected (this is different from the group key of the level 1 authentication procedure).

When there is a valid PMK stored in the mesh device, then at 245, the mesh device attempts Level 3 authentication. The mesh device sends an authentication request frame/message including a PMK control field flag that is set, and a list of the valid PMKs IDs found in the mesh device, and this message is used to start the EAP handshake key derivation process described above in connection with FIG. 4. There may be more than one authenticators in the mesh network, e.g., more than one FAR (or the authenticator function can be pushed into the mesh) and the FARs may not have synchronized their PMK key state. Thus, the authenticator may be centralized or distributed.

When a device attempts Level 2 authentication, it may or may not list any PMK IDs for valid PMKs that it has (in addition to any PTK IDs for valid PTKs) at 225. In doing so, the same authentication request message for PTK-based authentication may include information for PMK-based authentication (in a single message). Upon receiving such a message, the authenticator server may choose to initiate a Level 2 or Level 3 authentication procedure in response.

If at 250, it is determined whether the Level 3 authentication is successful and whether the PMK lifetime of all the PMKs used for authentication have expired. If not, or if there is no valid PMK stored in the mesh device (all PMKs have since expired), then a Level 4, full certificate-based authentication is attempted at 260. At 265, it is determined whether the Level 4 authentication is successful, and if not, then at 270, another attempt at full authentication is performed a period of time later. If authentication is successful with any of the Level 1, Level 2, Level 3, or Level 4 authentication procedures, then at 275, a start time is established for a next authentication of the mesh device using any one or more of the levels of authentication, based on some configuration information or a PAN beacon.

Figure 9:
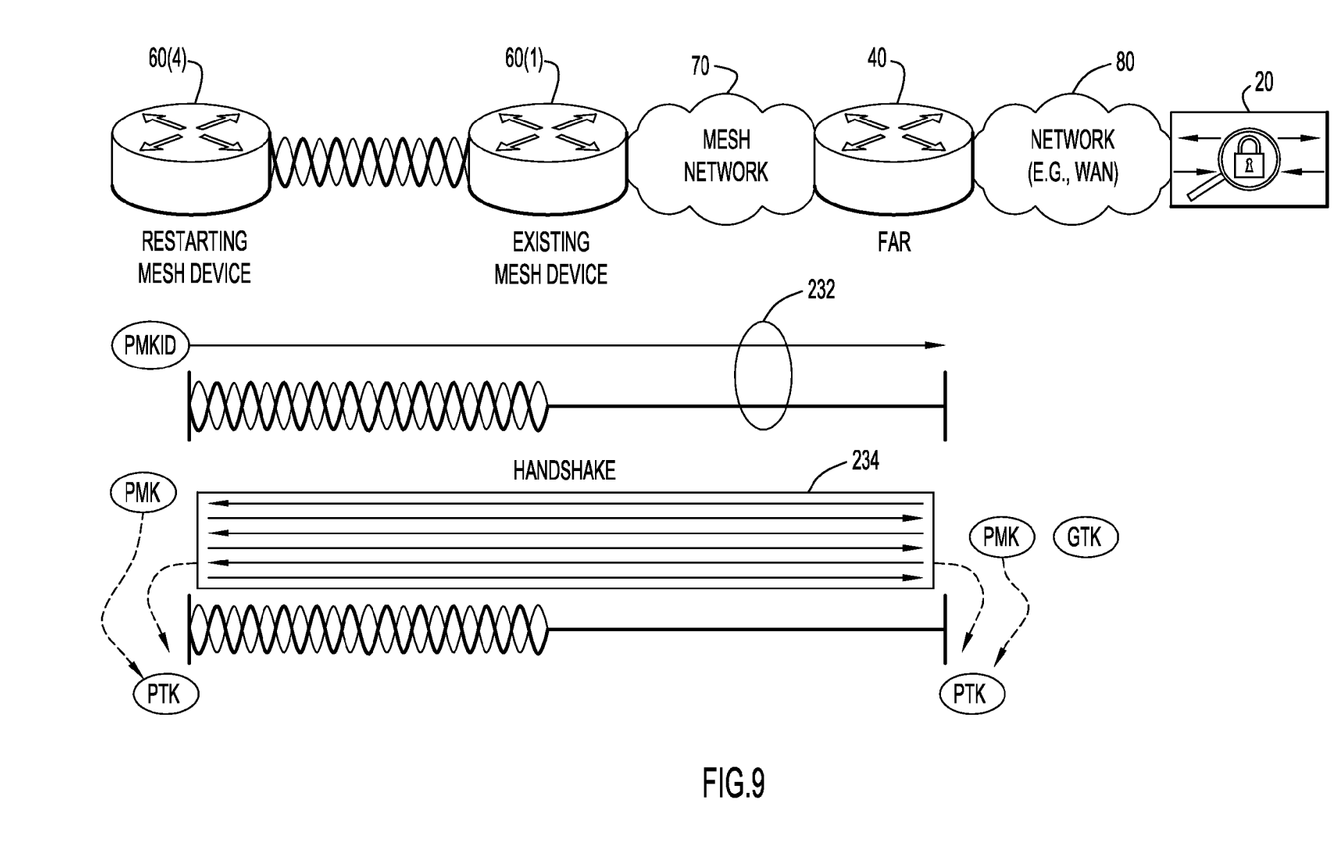
FIG. 9 is a flow diagram depicting flow of messages during a particular level of authentication in the scheme shown in FIG. 8.

FIG. 9 illustrates in more detail the operations performed during the Level 2 authentication procedure 230. At 232, the mesh device 60(4) seeking to join the mesh network sends an authentication request message containing one or more PTK IDs of PTKs to the authenticator. The mesh device 60(1), already authenticated and part of the mesh network, forwards the authentication request message from the mesh device 60(4) to the authenticator (FAR 40). Also at 232, as explained above, upon receiving the authentication request message, the authenticator examines its own local non-volatile storage, finds a PTK ID it has from the list of PTK IDs presented. The authenticator caches PTKs, PTK IDs and lifetime related information for PTKs in a memory, e.g., a non-volatile memory, for use when receiving authentication requests with PTK IDs from mesh devices seeking authentication. If more than one valid PTK ID is presented to the authenticator, the authenticator selects the PTK with the longest remaining lifetime. The authenticator then sends an authentication response message back to the new mesh device, and the response message contains the selected PTK ID. At 234, the mesh device 60(4), upon receiving the PTK ID in the response message, starts GTK distribution procedure with the authenticator to communicate a new GTK. Ultimately, during the GTK handshake procedure 234, the authenticator sends the GTK, encrypted with the PTK, to the mesh device 60(4). Thereafter, the mesh device 60(4) uses the GTK to send and receive traffic in the mesh network. A similar flow occurs for authentication based on PMKs.

The multi-level hierarchical authentication scheme depicted in FIGS. 8 and 9 may be summarized as follows. A device in a mesh network, upon boot up, determines whether there is at least one valid group temporal key for the mesh network stored in the device. The device initiates a first authentication procedure using the valid group temporal key if one is stored in the device. If there is no valid group temporal key or authentication fails using the first authentication procedure, the device determines whether there is at lest one valid pairwise temporal key for the mesh network stored in the device. If at least one valid pairwise temporal key is stored in the device, the device initiates a second authentication procedure using the pairwise temporal key. If there is no valid pairwise temporal key or authentication fails using the second authentication procedure, the device determines whether there is at least one valid pairwise master key for the mesh network stored in the device. If at least one valid pairwise master key is stored in the device, the device initiates a second authentication procedure using the valid pairwise master key. If authentication with the second authentication procedure fails or a valid pairwise master key is not stored in the device, the device initiates a certificate-based authentication exchange with an authenticator device for the mesh network.

A device may choose to skip one or more of the procedures in the multi-level hierarchical authentication scheme. For example, a device may choose not to cache PTKs in non-volatile memory. Thus, if the first authentication procedure with a GTK fails, the device may move directly to the third authentication procedure using pairwise master keys.

The above description is intended by way of example only.

What is claimed is:

1. A method comprising:
   at a device in a mesh network, upon boot up, determining whether there is at least one valid group temporal key for the mesh network stored in the device;
   initiating a first authentication procedure using the valid group temporal key if one is stored in the device;
   determining whether there is at least one valid pairwise temporal key for the mesh network stored in the device if there is no valid group temporal key or authentication fails using the first authentication procedure; and
   initiating a second authentication procedure using the valid pairwise temporal key if at least one valid pairwise temporal key is stored in the device.

2. The method of claim 1, and further comprising initiating a third authentication procedure using a pairwise master key if authentication with the second authentication procedure fails or a valid pairwise temporal key is not stored in the device.

3. The method of claim 2, and further comprising initiating a fourth authentication procedure comprising a certificate-based authentication exchange with an authenticator device for the mesh network if authentication with the first, second and third authentication procedures fail or a valid pairwise master key is not stored in the device.

4. The method of claim 2, and further comprising sending an authentication request message including an identifier of one or more pairwise temporal keys and one or more pairwise master keys to enable pairwise temporal key based authentication with the second authentication procedure or pairwise master key based authentication with the third authentication procedure.

5. The method of claim 1, wherein initiating the first authentication procedure comprises sending an authentication request message to a centralized authenticator device for the mesh network, the authentication request message containing information configured to indicate to the authenticator device that group temporal key based authentication is requested.

6. The method of claim 5, and further comprising receiving from the authenticator device, as part of the first authentication procedure, a response message including information indicating that there is a new group temporal key, and sending to the authenticator device a request message including information requesting the new group temporal key.

7. The method of claim 6, and further comprising receiving the new group temporal key encrypted with a pairwise temporal key from the authenticator device.

8. The method of claim 1, wherein initiating the first authentication procedure comprises sending an authentication request message to a one-hop neighbor mesh device that has already been authenticated in the mesh network, the authentication request message including information configured to indicate to the authenticator device that group temporal key based authentication is requested.

9. The method of claim 1, and further comprising determining whether at least one group temporal key stored in the device is valid based at least on lifetime information indicating a time duration that the group temporal key is valid with respect to some initial start time.

10. The method of claim 9, wherein if there are determined to be multiple valid group temporal keys in the memory of the device, further comprising selecting one of the group temporal keys having a longest remaining valid lifetime.

11. An apparatus comprising:
    a transceiver unit configured to send and receive messages in a mesh network;
    a non-volatile memory configured to store one or more group temporal keys and one or more pairwise temporal keys and one or more pairwise master keys;
    a processor coupled to the transceiver unit, wherein the processor:
      upon boot up, determines whether there is a valid group temporal key for the mesh network stored in the non-volatile memory;
      initiates a first authentication procedure using the valid group temporal key if one is stored in the non-volatile memory;
      determines whether there is a valid pairwise temporal key for the mesh network stored in the non-volatile memory if there is no valid group temporal key or authentication fails using the first authentication procedure; and
      initiates a second authentication procedure using the pairwise temporal key if at least one valid pairwise temporal key is stored in the non-volatile memory.

12. The apparatus of claim 11, wherein the processor initiates a third authentication procedure using a pairwise master key if authentication with the second authentication procedure fails or a valid pairwise temporal key is not stored in the non-volatile memory.

13. The apparatus of claim 12, wherein the processor initiates a fourth authentication procedure comprising a certificate-based authentication exchange with an authenticator device for the mesh network if authentication with the first, second and third authentication procedures fail or a valid pairwise master key is not stored in the non-volatile memory.

14. The apparatus of claim 12, wherein the processor generates an authentication request message including an identifier of one or more pairwise temporal keys and one or more pairwise master keys to enable pairwise temporal key based authentication with the second authentication procedure or pairwise master key based authentication with the third authentication procedure.

15. The apparatus of claim 11, wherein the processor initiates the first authentication procedure by sending an authentication request message to an authenticator device for the mesh network, the authentication request message containing information configured to indicate to the authenticator device that group temporal key based authentication is requested.

16. The apparatus of claim 11, wherein the processor initiates the second authentication procedure by sending to an authenticator device for the mesh network an authentication request message including information indicating that pairwise temporal key authentication is requested and an identifier of one or more pairwise temporal keys.

17. A computer readable storage device encoded with instructions that when executed are operable to:
    upon boot up of a device in a mesh network, determine whether there is at least one valid group temporal key for the mesh network stored in the device;
    initiate a first authentication procedure using the valid group temporal key if one is stored in the device;
    determine whether there is at least one valid pairwise temporal key for the mesh network stored in the device if there is no valid group temporal key or authentication fails using the first authentication procedure;
    initiate a second authentication procedure using the valid pairwise temporal key if at least one valid pairwise master key is stored in the device.

18. The computer readable storage device of claim 17, and further comprising instructions that are operable to initiate a third authentication procedure using a pairwise master key if authentication with the second authentication procedure fails or a valid pairwise temporal key is not stored in the device.

19. The computer readable storage device of claim 18, and further comprising instructions that are operable to initiate a fourth authentication procedure comprising a certificate-based authentication exchange with an authenticator device for the mesh network if authentication with the first, second and third authentication procedures fail or a valid pairwise master key is not stored in the device.

20. The computer readable storage device of claim 17, further comprising instructions operable to generate an authentication request message including an identifier of one or more pairwise temporal keys and one or more pairwise master keys to enable pairwise temporal key based authentication with the second authentication procedure or pairwise master key based authentication with the third authentication procedure.

21. The computer readable storage device of claim 17, further comprising instructions operable to generate an authentication request message to be sent to a centralized authenticator device for the mesh network, the authentication request message containing information configured to indicate to the authenticator device that group temporal key based authentication is requested.

22. The computer readable storage device of claim 21, further comprising instructions operable to process a response message, received from the authenticator device as part of the first authentication procedure, the response message including information indicating that there is a new group temporal key, and to generate a request message to be sent to the authenticator device, the request message including information requesting the new group temporal key.

23. The computer readable storage device of claim 17, further comprising instructions operable to initiate the first authentication procedure by generating an authentication request message to be sent to a one-hop neighbor mesh device that has already been authenticated in the mesh network, the authentication request message including information configured to indicate to the authenticator device that group temporal key based authentication is requested.

24. The computer readable storage device of claim 17, further comprising instructions operable to determine whether at least one group temporal key stored in the device is valid based at least on lifetime information indicating a time duration that the group temporal key is valid with respect to some initial start time.

25. The computer readable storage device of claim 17, further comprising instructions operable to, if is determined that there are multiple valid group temporal keys in the memory of the device, select one of the group temporal keys having a longest remaining valid lifetime.

* * * * *